(12) United States Patent
Yang

(10) Patent No.: US 11,036,721 B2
(45) Date of Patent: *Jun. 15, 2021

(54) FACILITATING PRACTICAL BYZANTINE FAULT TOLERANCE BLOCKCHAIN CONSENSUS AND NODE SYNCHRONIZATION

(71) Applicant: Advanced New Technologies Co., Ltd., George Town (KY)

(72) Inventor: Dayi Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,645

(22) Filed: Oct. 12, 2020

(65) Prior Publication Data

US 2021/0026839 A1    Jan. 28, 2021

Related U.S. Application Data

(63) Continuation of application No. 16/390,375, filed on Apr. 22, 2019, now Pat. No. 10,803,052, which is a
(Continued)

(51) Int. Cl.
*H04L 9/06*      (2006.01)
*G06F 16/23*     (2019.01)
(Continued)

(52) U.S. Cl.
CPC ...... *G06F 16/2365* (2019.01); *G06F 11/0709* (2013.01); *G06F 11/183* (2013.01);
(Continued)

(58) Field of Classification Search
None
See application file for complete search history.

(56) References Cited

U.S. PATENT DOCUMENTS 7,926,093 B2   4/2011   Eibach et al.
8,745,401 B1   6/2014   Hintz et al.
(Continued)

FOREIGN PATENT DOCUMENTS

CN    107124403    9/2017
CN    107301600    10/2017
(Continued)

OTHER PUBLICATIONS

Auld, "Broadcast Distributed Shared Memory," Dissertation Presented to The Faculty of the Department of Computer Science, The College of Williams & Mary in Virginia, Jan. 2001, 203 pages.
(Continued)

*Primary Examiner* — Tuankhanh D Phan
(74) *Attorney, Agent, or Firm* — Fish & Richardson P.C.

(57) ABSTRACT

Implementations of the present disclosure include setting, by a first consensus node, a timer that runs out before a timeout of a view change; sending, to a second consensus node, a request for one or more consensus messages missing by the first consensus node in response to the timer running out; receiving, from the second consensus node, the one or more consensus messages each digitally signed by a private key of a corresponding consensus node that generates the respective one or more consensus messages; and determining that a block of transactions is valid, if a quantity of commit messages included in the received one or more consensus messages is greater than or equal to 2f+1, where f is a maximum number of faulty nodes that is tolerable by the blockchain based on practical Byzantine fault tolerance.

20 Claims, 5 Drawing Sheets

Related U.S. Application Data continuation of application No. PCT/CN2018/114334, filed on Nov. 7, 2018.

(51) Int. Cl.
    *G06F 11/18*     (2006.01)
    *G06F 11/07*     (2006.01)
    *H04L 9/32*     (2006.01)

(52) U.S. Cl.
    CPC ........ *G06F 11/187* (2013.01); *G06F 16/2379* (2019.01); *H04L 9/0637* (2013.01); *H04L 9/3247* (2013.01); *G06F 11/182* (2013.01); *G06F 2201/82* (2013.01); *H04L 2209/38* (2013.01)

(56) References Cited

U.S. PATENT DOCUMENTS

| | | | |
|---|---|---|---|
| 10,803,052 | B2 | 10/2020 | Yang |
| 2018/0157558 | A1 | 6/2018 | Karaxne et al. |
| 2019/0251077 | A1 | 8/2019 | Yang |

FOREIGN PATENT DOCUMENTS

| | | |
|---|---|---|
| CN | 107579848 | 1/2018 |
| EP | 3542514 | 11/2019 |
| KR | 20/70137388 | 12/2017 |
| RU | 181439 | 7/2018 |
| WO | WO 20171863/7 | 11/2017 |
| WO | WO 7018095540 | 5/2018 |
| WO | WO 2019072263 | 4/2019 |

OTHER PUBLICATIONS

Baliga. "Understanding Blockchain Consensus Models," Persistent, Apr. 2017, 14 pages.
Buchman et al., "The latest gossip on BFT consensus," Arxiv.org, Cornell University Library, Sep. 2018, 14 pages.
Castro et al., "Proactive Recovery in a Byzantine-Fault-Tolerant System," Proceedings of the 4th Conference on Symposium on Operating System Design & Implementation, Oct. 2000, 15 pages.
Crosby et al., "BlockChain Technology: Beyond Bitcoin," Sutardja Center for Entrepreneurship & Technology Technical Report, Oct. 16, 2015, 35 pages.
Extended European Search Report in European Application No. 18865827.2, dated Oct. 25, 2019, 10 pages.
Kokoris-Kogias et al., "Enhancing Bitcoin Secuiity and Performance with Strong Consistency via Collective Siwiing," Proceedings of the 25th USENIX Security Symposium, Aug. 2016, pp. 279-296.
Nakamoto, "Bitcoin: A Peer-to-Peer Electronic Cash System," www.bitcoin.org, 2005, 9 pages.
PCT International Search Report and Wiiften Opinion in International Application No. PCT/CN2018/114334, dated Aug. 6, 2019, 7 pages.
Singh et al., "Zeno: Eventually Consistent Byzantine-Fault Tolerance," USENIX, The Advanced Computing Systems Association, Apr. 2009, pp. 169-184.
Castro et al, "Proactive Recovery in a Byzantine-Fault-Tolerant System" USENIX, The Advanced Computing Systems Association, Oct. 2000, 15 pages.
Singhi et al, "Zeno: Eventually Consistent Byzantine-Fault Tolerance", USE-NIX, The Advanced Computing Systems Association, Apr. 2009, 16 pages.
Extended European Search Report in European Application No. 21156351.5, dated Mar. 31, 2021, 8 pages.
Kogias et al, "Enhancing Bitcoin Security and Performance with Strong Consistency via Collective Signing," 25th USENIX Security Symposium, Aug. 10, 2016, 19 pages.

FACILITATING PRACTICAL BYZANTINE FAULT TOLERANCE BLOCKCHAIN CONSENSUS AND NODE SYNCHRONIZATION

CROSS-REFERENCE TO RELATED APPLICATIONS

This application is a continuation of and claims the benefit of priority of U.S. patent application Ser. No. 16/390,375, filed Apr. 22, 2019, which is a continuation of PCT Application No. PCT/CN2018/114334, filed on Nov. 7, 2018, which are hereby incorporated by reference in their entirety.

BACKGROUND

Blockchain networks, which can also be referred to as blockchain systems, consensus networks, distributed ledger system (DLS) networks, or blockchain, enable participating entities to securely, and immutably store data. A blockchain can be described as a ledger of transactions, and multiple copies of the blockchain are stored across the blockchain network. Example types of blockchains can include public blockchains, consortium blockchains, and private blockchains. A public blockchain is open for all entities to use the blockchain, and participate in the consensus process. A private DLS is provided for a particular entity, which centrally controls read and write permissions.

Another type of blockchain system includes a consortium blockchain system. A consortium blockchain system is provided for a select group of entities, which control the consensus process, and includes an access control layer. Consequently, one or more entities participating in the consortium blockchain system have control over who can access the consortium blockchain system, and who can participate in the consensus process of the consortium blockchain system. For example, a group of enterprise (e.g., companies, academic institutions) can participate in a consortium blockchain system to immutably record data (e.g., transactions). In some examples, an entity can be able to access/view data within the consortium blockchain system, but not contribute data to the consortium blockchain system.

A blockchain includes a series of blocks, each of which contains one or more transactions executed in the network. Each block can be analogized to a page of the ledger, while the blockchain itself is a full copy of the ledger. Individual transactions are confirmed and added to a block, which is added to the blockchain. Copies of the blockchain are replicated across nodes of the network. In this manner, there is a consensus across the network as to the state of the blockchain.

Fault tolerance is of concern in blockchain systems. Fault tolerance can generally be described as the tolerance of a network to nodes that fail, or act maliciously. Fault tolerance is of particular concern in blockchain systems having fewer participating nodes, such as consortium blockchain systems. Byzantine fault tolerance (BFT) can be described as the dependability of a fault-tolerant, distributed computing system, such as a blockchain system. BFT describes the dependability, in cases where components may fail, and/or is malicious, and there is imperfect information on whether a component has failed, or is malicious. BFT is leveraged in consensus protocols to enable systems to achieve consensus despite malicious nodes of the system propagating incorrect information to other peers. The objective of BFT is to defend against system failures by mitigating the influence the malicious nodes have on the correct function of the consensus protocol. Practical BFT (PBFT) is an optimization of BFT. PBFT works in asynchronous systems, such as a consortium blockchain system, and assumes that there are independent node failures, and manipulated messages propagated by specific, independent nodes. In PBFT, all of the nodes in a consensus system are ordered in a sequence with one node being a primary node (different nodes being designated as the primary node over time), and the other nodes being backup nodes. All of the nodes communicate with each other through broadcast messages, and, so-called honest nodes come to consensus through a majority.

In PBFT, consensus safety can ensure that two nodes that do not have any problems associated with them do not come to a consensus with different values. Consensus liveness can ensure that the nodes do not fall under infinite loops while exchanging messages, and the nodes can come to their final state.

In some cases, the consensus nodes in a consortium blockchain can be far apart geographically, and the network quality or connectivity cannot be guaranteed. In such cases, broadcast messages may not reach all of the consensus nodes, which affects the ability of the consensus nodes to come to PBFT consensus. As a result, collecting enough replies to reach consensus can be time consuming and computationally burdensome.

SUMMARY

Implementations of the present disclosure are directed to facilitating synchronization and consensus processes of a blockchain network based on practical Byzantine fault tolerance (PBFT). More particularly, implementations of the present disclosure are directed to facilitating consensus message transmissions and node synchronization in a blockchain network based on PBFT by using a gossip-based communications method, and adding digital signatures to consensus messages.

In some implementations, actions include setting, by a first consensus node, a timer that runs out before a timeout of a view change; sending, to a second consensus node, a request for one or more consensus messages missing by the first consensus node in response to the timer running out; receiving, from the second consensus node, the one or more consensus messages each digitally signed by a private key of a corresponding consensus node that generates the respective one or more consensus messages; and determining that a block of transactions is valid, if a quantity of commit messages included in the received one or more consensus messages is greater than or equal to 2f+1, where f is a maximum number of faulty nodes that is tolerable by the blockchain based on practical Byzantine fault tolerance. Other implementations include corresponding systems, apparatus, and computer programs, configured to perform the actions of the methods, encoded on computer storage devices.

These and other implementations may each optionally include one or more of the following features: the request includes a sequence number that indicates a number of a consensus round; the one or more consensus messages include one or more of pre-prepare messages, prepare messages, and commit messages missing by the first consensus node; the one or more consensus messages are stored in one or more consensus nodes in which they are generated or stored, until a stable checkpoint is reached; receiving one or more sequence numbers corresponding to the one or more consensus messages, wherein each sequence number indicates a number of a consensus round associated with a corresponding consensus message; submitting the block of transactions to a blockchain and a status database, if the block of transactions is determined valid; sending, to a third consensus node, a request for a second one or more consensus messages missing by the second consensus node in response to the timer running out and if the block of transactions is determined invalid; receiving, from the third consensus node, the second one or more consensus messages each digitally signed by a private key of a corresponding consensus node that generates the respective second one or more consensus message; and determining that the block of transactions is valid, if a quantity of the commit messages included in the one or more consensus messages and the second one or more consensus messages is greater than or equal to 2f+1.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
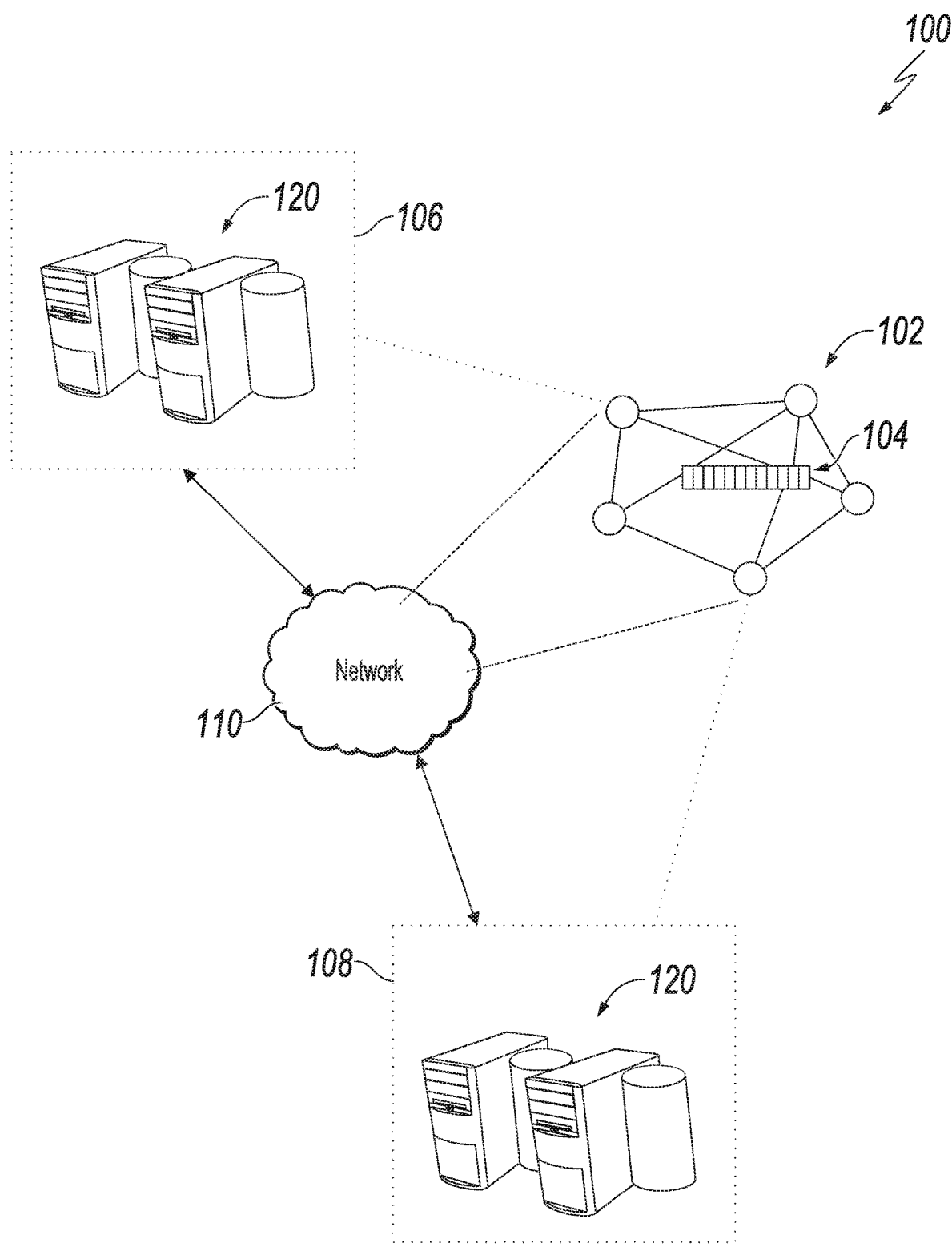
FIG. 1 depicts an example environment that can be used to execute implementations of the present disclosure.

Implementations of the present disclosure are directed to facilitating synchronization and consensus processes of a blockchain network based on practical Byzantine fault tolerance (PBFT). More particularly, implementations of the present disclosure are directed to facilitating consensus message transmissions and node synchronization in a blockchain network based on PBFT by using a gossip-based communications method, and adding digital signatures to consensus messages. In this manner, and as described in further detail herein, communications bandwidth consumption can be reduced, and system reliability can be improved. In some implementations, actions include setting, by a first consensus node, a timer that runs out before a timeout of a view change; sending, to a second consensus node, a request for one or more consensus messages missing by the first consensus node in response to the timer running out; receiving, from the second consensus node, the one or more consensus messages each digitally signed by a private key of a corresponding consensus node that generates the respective one or more consensus messages; and determining that a block of transactions is valid, if a quantity of commit messages included in the received one or more consensus messages is greater than or equal to 2f+1, where f is a maximum number of faulty nodes that is tolerable by the blockchain based on practical Byzantine fault tolerance.

To provide further context for implementations of the present disclosure, and as introduced above, blockchain networks, which can also be referred to as consensus networks (e.g., made up of peer-to-peer nodes), distributed ledger systems, or simply blockchain, enable participating entities to securely and immutably conduct transactions and store data. A blockchain can be provided as a public blockchain, a private blockchain, or a consortium blockchain. Implementations of the present disclosure are described in further detail herein with reference to a consortium blockchain, in which the consensus process is controlled by a pre-selected set of nodes. It is contemplated, however, that implementations of the present disclosure can be realized in any appropriate type of blockchain.

In a consortium blockchain, the consensus process is controlled by an authorized set of nodes, one or more nodes being operated by a respective entity (e.g., an enterprise). For example, a consortium of ten (10) entities (e.g., companies) can operate a consortium blockchain system, each of which operates at least one node in the consortium DLS. Accordingly, the consortium blockchain system can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain. An example consortium blockchain system includes Quorum, developed by J.P. Morgan Chase & Co. of New York, N.Y. Quorum can be described as an enterprise-focused, permissioned blockchain infrastructure specifically designed for financial use cases. Quorum is built off of Go Ethereum, the base code for the Ethereum blockchain, which is provided by the Ethereum Foundation of Zug, Switzerland.

In general, a consortium blockchain system supports transactions between entities participating, with permission, in the consortium blockchain system. A transaction is shared with all of the nodes within the consortium blockchain system, because the blockchain is replicated across all nodes. That is, all nodes are in perfect state of consensus with respect to the blockchain. To achieve consensus (e.g., agreement to the addition of a block to a blockchain), a consensus protocol is implemented within the consortium blockchain network. An example consensus protocol includes, without limitation, proof-of-work (POW) implemented in the Bitcoin network.

Implementations of the present disclosure include computer-implemented methods for facilitating consensus processes of a blockchain network based on PBFT. More particularly, implementations of the present disclosure are directed to facilitating consensus message transmissions and node synchronization in a blockchain network based on PBFT by using a gossip-based communications method, and adding digital signature to consensus messages. In this manner, and as described in further detail herein, communications bandwidth consumption can be reduced, and system reliability can be improved.

In accordance with implementations of the present disclosure, consensus nodes of a consortium blockchain system execute a PBFT consensus protocol. In some examples, nodes can send consensus messages. In accordance with implementations of the present disclosure, example consensus messages can include, without limitation, pre-prepare, prepare, and commit. In some implementations, a digital signature and a sequence number are included with each consensus message. The digital signature can be used to identify the node that sent the respective consensus message, and the sequence number indicates a consensus round, within which the consensus message was sent.

Each consensus node can store or log all of the consensus messages received. If a consensus node (e.g., backup node) of the blockchain network is recovered from a disconnection, and had missed one or more consensus messages, it can synchronize with other nodes by fetching missed messages from one or more other consensus nodes. In accordance with implementations of the present disclosure, consensus messages can be fetched using a gossip algorithm, as opposed to, for example, broadcasting a fetch request to the entire blockchain network. Because the consensus messages fetched from another consensus node bear the respective consensus node's digital signature, the source of the fetched consensus message can be confirmed (and trusted). In some examples, the backup node may be able to fetch all missed messages in a single synchronization. As such, the complexity of synchronization, or consensus can be reduced to O(1) under ideal conditions, as compared to O(n) based on standard multicasting of traditional PBFT.

FIG. 1 depicts an example environment 100 that can be used to execute implementations of the present disclosure. In some examples, the example environment 100 enables entities to participate in a consortium blockchain system 102. The example environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the consortium blockchain system 102, for storing transactions in a blockchain 104. Example computing devices include, without limitation, a server, a desktop computer, a laptop computer, a tablet computing device, and a smartphone. In some examples, the computing systems 106, 108 host one or more computer-implemented services for interacting with the consortium blockchain system 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as transaction management system that the second entity uses to manage its transactions with one or more other entities (e.g., other users). In the example of FIG. 1, the consortium blockchain system 102 is represented as a peer-to-peer network of nodes, and the computing systems 106, 108 provide nodes of the first entity, and second entity respectively, which participate in the consortium blockchain system 102.

Figure 2:
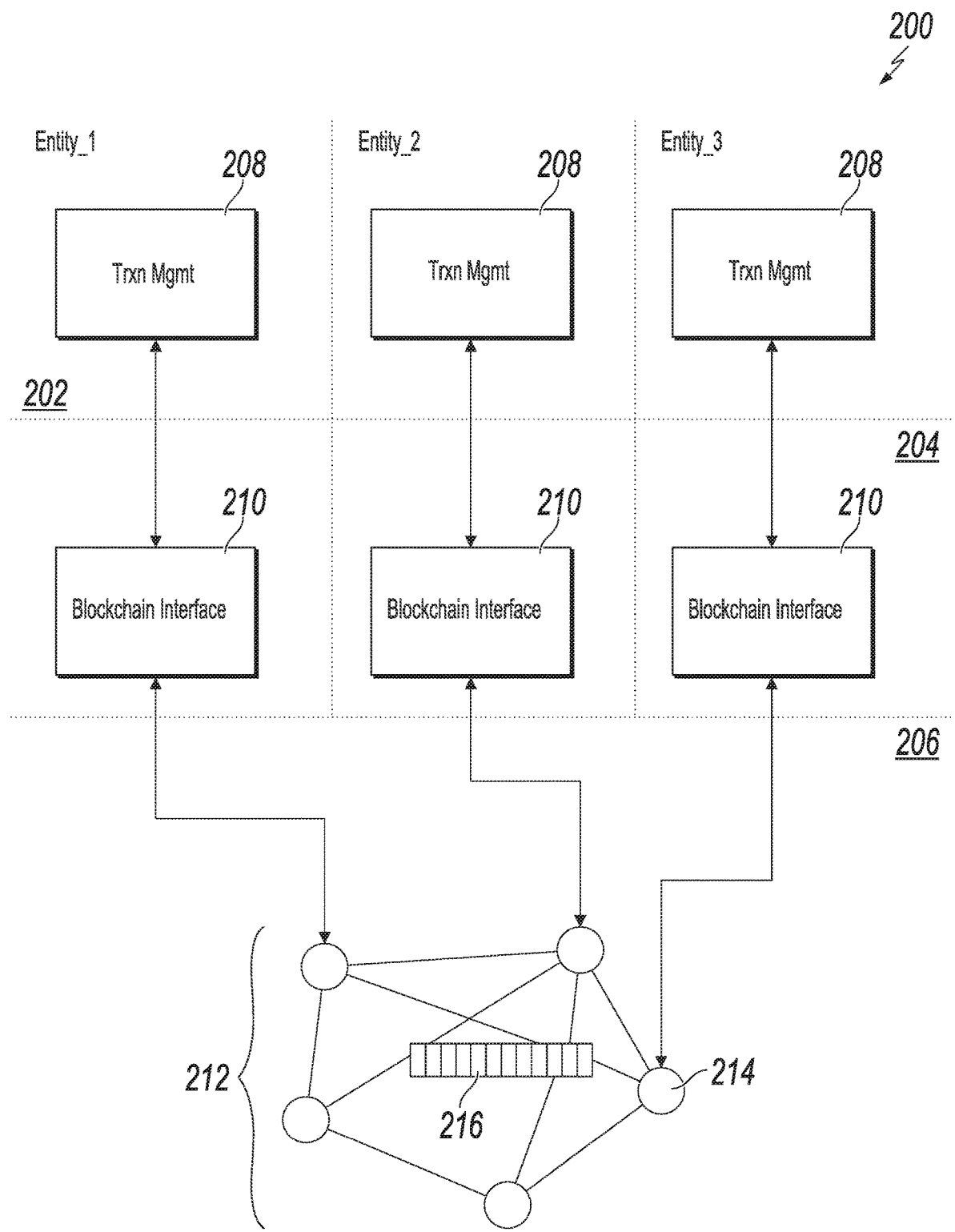
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an entity layer 202, a hosted services layer 204, and a blockchain layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes blockchain interfaces 210 for each transaction management system 208. In some examples, a respective transaction management system 208 communicates with a respective blockchain interface 210 over a network (e.g., the network 110 of FIG. 1) using a communication protocol (e.g., hypertext transfer protocol secure (HTTPS)). In some examples, each blockchain interface 210 provides a communication connection between a respective transaction management system 208, and the blockchain layer 206. More particularly, each blockchain interface 210 enables the respective entity to conduct transactions recorded in a consortium blockchain system 212 of the blockchain layer 206. In some examples, communication between a blockchain interface 210, and the blockchain layer 206 is conducted using remote procedure calls (RPCs). In some examples, the blockchain interfaces 210 "host" blockchain nodes for the respective transaction management systems 208. For example, the blockchain interfaces 210 provide the application programming interface (API) for access to the consortium blockchain system 212.

As described herein, the consortium blockchain system 212 is provided as a peer-to-peer network including a plurality of nodes 214 that immutably record information in a blockchain 216. Although a single blockchain 216 is schematically depicted, multiple copies of the blockchain 216 are provided, and are maintained across the consortium blockchain system 212. For example, each node 214 stores a copy of the blockchain 216. In some implementations, the blockchain 216 stores information associated with transactions that are performed between two or more entities participating in the consortium blockchain system 212.

Figure 3:
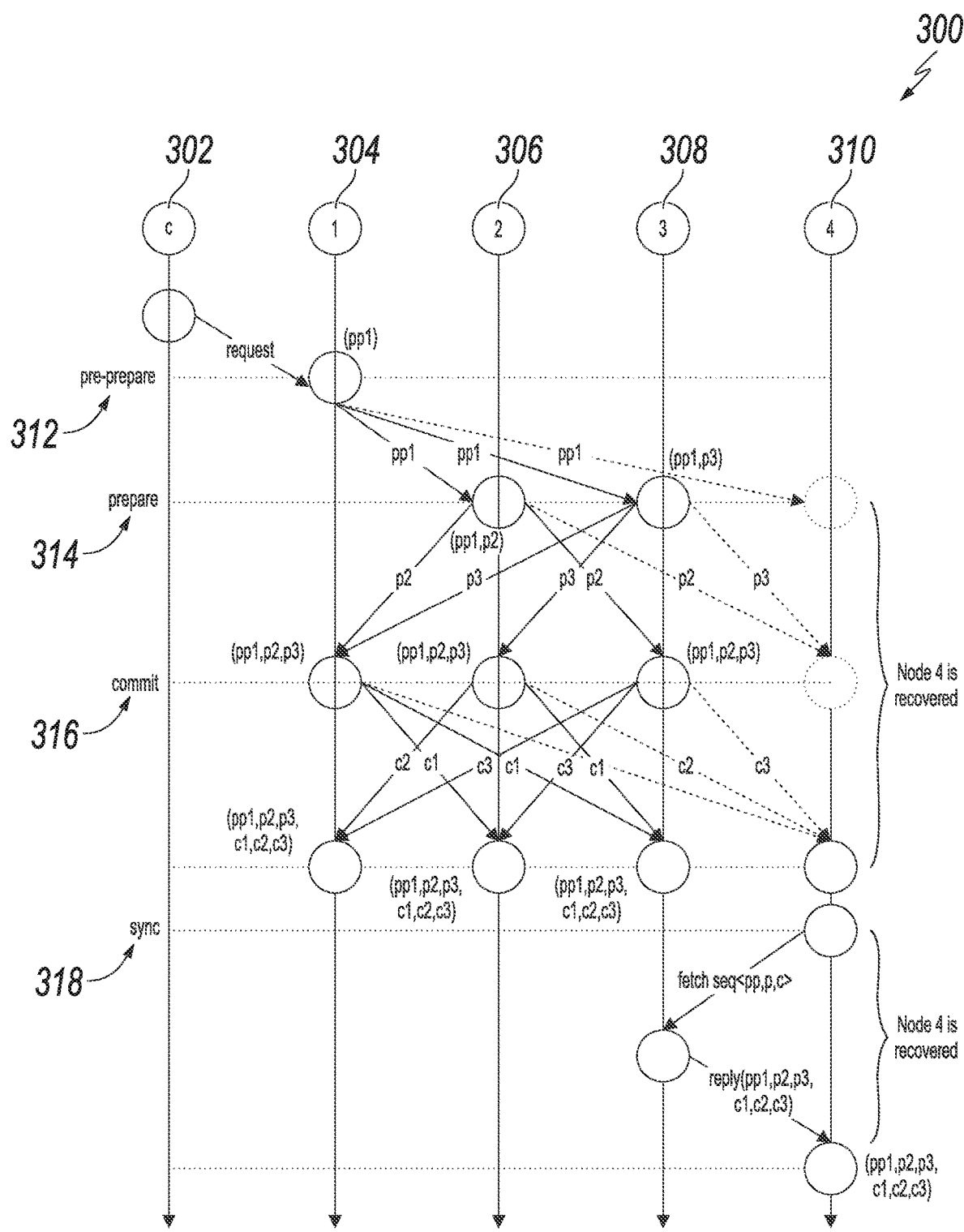
FIG. 3 depicts an example consensus process based on PBFT in accordance with implementations of the present disclosure.

FIG. 3 depicts an example consensus process 300 based on PBFT in accordance with implementations of the present disclosure. At a high-level, the example consensus process 300 is performed by a client node (node c 302), a leader node (node 1 304), and a plurality of backup nodes (node 2 306, node 3 308, and node 4 310) of a blockchain network. The consensus algorithm used by the blockchain network is assumed to be PBFT. A PBFT system can include three phases. Example phases can include, without limitation, pre-prepare 312, prepare 314, and commit 316. In the depicted example, the node 4 310 is disconnected, or otherwise unavailable during the three phases of a consensus round identified by a sequence number represented by variable seq. After the node 4 310 is recovered, it can request to synchronize 318 with other nodes to fetch missing consensus messages to ensure safety and liveness of the PBFT consensus. To achieve faster synchronization, each consensus node can use its private key to digitally sign the consensus message it sends. As such, each consensus message bears a digital signature of its sending node. Even if the sending node is disconnected, or otherwise unavailable, a receiving node can securely forward the consensus message to ensure liveness of the network. Details of the example process 300 are further discussed in the following description of FIG. 3.

In some implementations, the client node 302 can send a request to add one or more transactions to the blockchain. In some cases, the request also includes a seq variable that indicates the current consensus round. For example, if the blockchain is in a third round of consensus, the variable seq is equal to 3.

Figure 4:
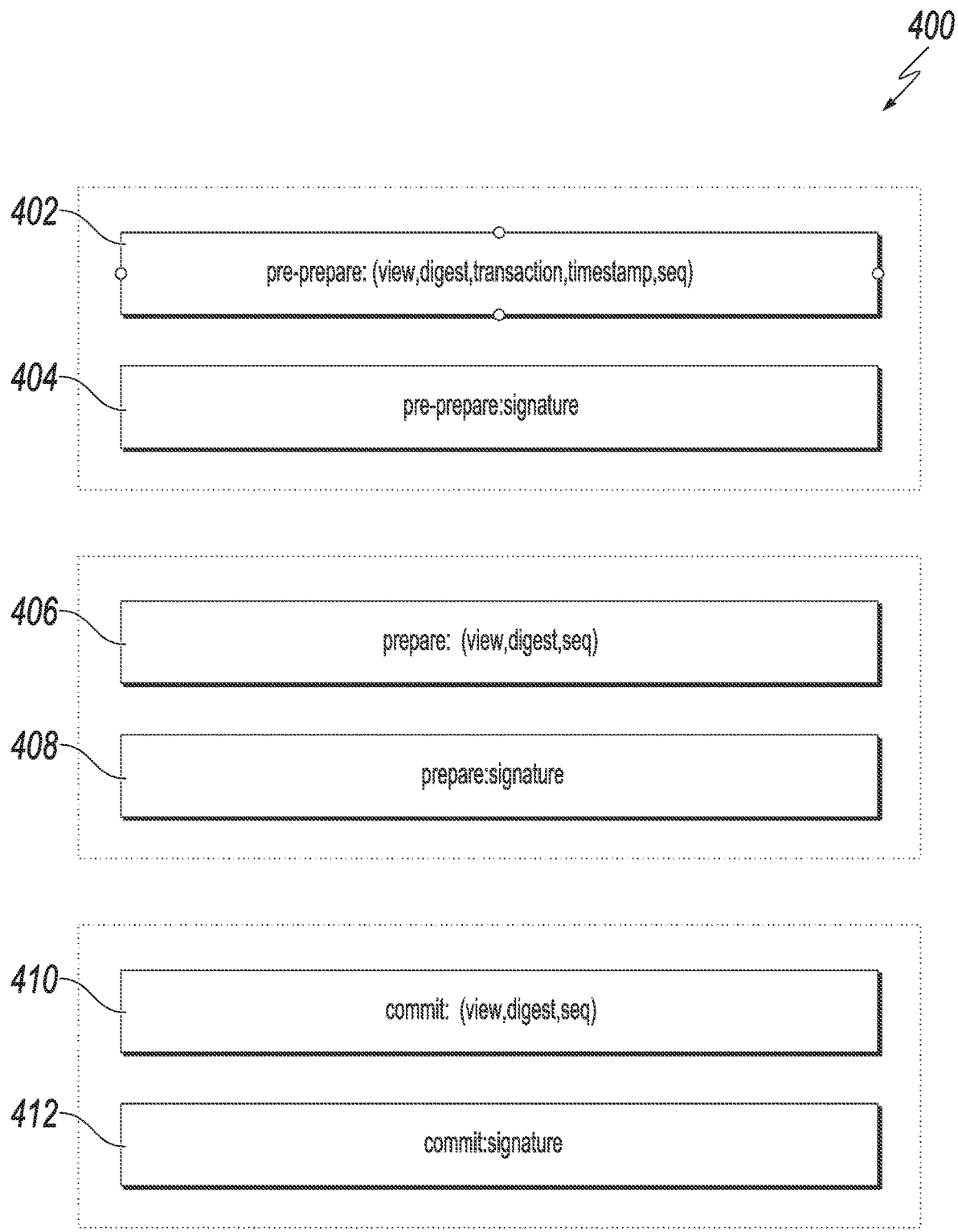
FIG. 4 depicts an example structure of a consensus message based on PBFT in accordance with implementations of the present disclosure.

After receiving one or more requests for adding one or more transactions to the blockchain from the client node 302, and/or other nodes, the node 1 (leader node) 304 can generate a digitally signed pre-prepare message (pp1). Briefly referring to FIG. 4, FIG. 4 depicts an example structure 400 of a consensus message based on PBFT in accordance with implementations of the present disclosure. As shown in FIG. 4, a pre-prepare message 402 can include view, digest, transaction, timestamp, and seq. The variable view can indicate the view change number v. View change in PBFT can provide liveness by allowing the PBFT to make progress when the leader node fails. View changes can be triggered by timeouts that prevent backup nodes from waiting indefinitely for requests to execute. A backup node can start a timer when it receives a request, and the timer is not already running. It can stop the timer when it is no longer waiting to execute the request. However, the backup node can restart the timer, if at that point it is waiting to execute other requests. If the timer of the backup node expires in view, the backup node can start a view change to move the system to view v+1.

Transaction can be the client node's request message for adding transactions to the blockchain. Digest can be the message's digest. Timestamp can be used to ensure that each client request is executed once. Timestamps can be ordered such that later requests have higher timestamps than earlier ones. For example, the timestamp could be the value of the client's local clock when the request is issued. Seq can indicate the consensus round of the message. In some implementations, a digital signature 404 can be added to the pre-prepare message 402 using a private key of the leader node. In some implementations, the consensus message, such as the pre-prepare message 402, can be stored in a node that accepts the message until a stable checkpoint is reached. A checkpoint can be the state produced by the execution of a request, and a checkpoint with a proof can be referred to as a stable checkpoint.

Referring again to FIG. 3, after generating the digitally signed pre-prepare message pp1, the leader node can multicast the message to the backup nodes, the node 2 306, the node 3 308, and the node 4 310.

After the node 2 306 and the node 3 308 accept the pre-prepare message pp1, they can enter the prepare phase 314. At this point, the node 4 310 is disconnected from the blockchain network, or otherwise unavailable. As such, it cannot receive pp1, generate prepare message, or perform multicasting. The pre-prepare and prepare phases can be used to order requests sent in the same view, even when the leader node, which proposes the ordering of requests, is faulty.

At the prepare phase 314, the node 2 306 can multicast its prepare message p2 to other nodes, and add both pp1 and p2 to its log. Similarly, the node 3 308 can multicast its prepare message p3 to other nodes, and add both pp1 and p3 to its log. Referring again to FIG. 4, the prepare message 406 can include view, digest, and seq. A digital signature 408 can be added to the prepare message 406.

Referring again to FIG. 3, the node 2 306 and the node 3 308 can digitally sign p2 and p3, respectively, using their private keys. In some implementations, a node can enter the commit phase 316, if it receives 2f consensus messages that has a digest the same as its own digest, where f is a maximum number of faulty nodes that is tolerable by the blockchain based on PBFT. The value f can be calculated as the largest integer less than or equal to (n−1)/3, where n is the total number of nodes. In the example consensus process 300, since the total number of nodes is 4, f=1.

Assuming that all received digests are the same as a node's own digest, after receiving p2 and p3, the node 1 304 has 2f digest messages, and can generate and multicast a commit c1, and add p2, p3, and c1 to its log. Similarly, the node 2 306 can generate and multicast a commit c2 after receiving pp1 and p3 and add p3 and c2 to its log. The node 3 308 can generate and multicast a commit c3 after receiving pp1 and p2 and add p2 and c3 to its log. As such, after a consensus node receives a digitally signed consensus message from another node, the consensus message and the digital signature can be locally stored at the receiving node. The digitally signed consensus messages can be sorted based on the corresponding seq value to ensure the correct order of the messages.

Referring again to FIG. 4, the commit message 410 can include view, digest, and seq. A digital signature 412 can be added to the commit message 410.

Referring again to FIG. 3, assuming that the node 4 310 recovers, and reconnects to the blockchain network, it can start the sync phase 318 to fetch missing messages during its down time. In some implementations, to avoid a timer of the node 4 310 expiring in view, and starting a view change, a fetch timer can be set to run out before the timeout of the view change.

In response to a fetch timer running out, the node 4 310 can determine one or more consensus nodes that have consensus messages that the node 4 310 missed. The node 4 310 can randomly select from the one or more consensus nodes to send a fetch request based on a gossip algorithm. The fetch request can include the seq number of the node, and the types of consensus messages that are missing.

In the example consensus process 300, the types of consensus messages that are missing include pre-prepare, prepare, and commit. As such, the fetch request can have a form of seq <pp, p, c>. In some examples, the node 4 310 randomly selects the node 3 308 based on the gossip algorithm to fetch the missing consensus messages. The node 3 308 has logged pp1, p2, p3, c1, c2, and c3 at the consensus round of seq. Because all the logged messages include digital signatures of the issuing nodes, their authenticity can be verifiable by using corresponding public keys of the issuing nodes. Since the node 3 308 has logged three consensus messages c1, c2, and c3, which are greater than or equal to 2f+1, it can provide the digitally signed messages pp1, p2, p3, c1, c2, c3 to the node 4 310. In some cases, if the node that receives the fetch request has logged less than 2f+1 consensus messages, the requesting node can fetch from other nodes in the system until at least 2f+1 consensus messages are obtained. In the example process 300, the node 4 310 can fetch all of the consensus messages as long as any one of the node 1 304, the node 2 306, and the node 3 308 is connected to the blockchain network. Therefore, the recovered node may only need to perform synchronization once to fetch the missing messages. As such, the network resources can be saved and the efficiency of the system can be improved.

Figure 5:
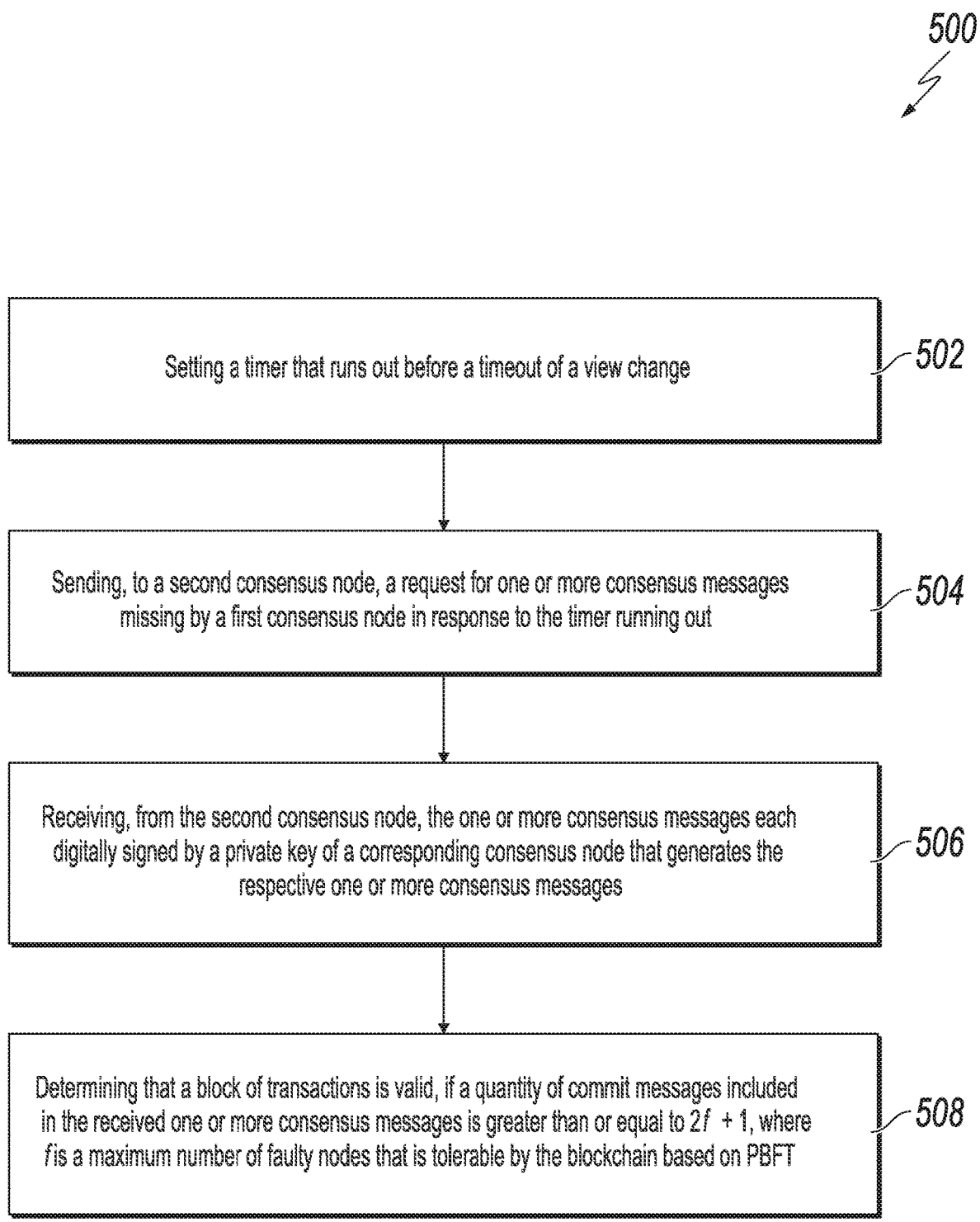
FIG. 5 depicts an example process that can be executed in accordance with implementations of the present disclosure.

FIG. 5 depicts an example process 500 that can be executed in accordance with implementations of the present disclosure. For clarity of presentation, the description that follows generally describes the example process 500 in the context of the other figures in this description. However, it will be understood that the example process 500 can be performed, for example, by any system, environment, software, and hardware, or a combination of systems, environments, software, and hardware, as appropriate. In some implementations, various steps of the example process 500 can be run in parallel, in combination, in loops, or in any order.

At 502, a backup node of a PBFT system reconnected to a blockchain network based on PBFT sets a timer that runs out before a timeout of a view change. At 504, the backup node sends, to another consensus node, a request for one or more consensus messages missing by the backup node in response to the timer running out. In some implementations, the request includes a sequence number that indicates a number of consensus rounds. In some implementations, the one or more consensus messages include one or more of pre-prepare messages, prepare messages, and commit messages missing by the first consensus node.

At 506, the backup node receives, from the consensus node, the one or more consensus messages each digitally signed by a private key of a corresponding consensus node that generates the respective one or more consensus messages. In some implementations, the one or more consensus messages include one or more of pre-prepare messages, prepare messages, and commit messages missing by the first consensus node. In some implementations, the one or more consensus messages are stored in one or more consensus nodes in which they are generated or stored, until a stable checkpoint is reached.

At 508, the backup node determines that a block of transactions is valid, if a quantity of commit messages included in the received one or more consensus messages is greater than or equal to 2f+1, where f is a maximum number of faulty nodes that is tolerable by the blockchain based on PBFT. In some implementations, the backup node further receives one or more sequence numbers corresponding to the one or more consensus messages. Each sequence number indicates a number of consensus rounds associated with a corresponding consensus message.

In some implementations, the backup node further submits the block of transactions to a blockchain, and a status database, if the block of transactions is determined valid. In some implementations, the backup node further sends to a third consensus node different from the consensus node and the backup node, a request for a second one or more consensus messages missing by the consensus node in response to the timer running out and if the block of transactions is determined invalid. The backup node receives, from the third consensus node, the second one or more consensus messages each digitally signed by a private key of a corresponding consensus node that generates the respective second one or more consensus message. The backup node then determines that the block of transactions is valid, if a quantity of the commit messages included in the one or more consensus messages and the second one or more consensus messages is greater than or equal to 2f+1.

Implementations of the subject matter described in this specification can be implemented so as to realize particular advantages or technical effects. For example, implementations of the present disclosure permit consensus nodes of a consortium blockchain to send digitally signed consensus messages with a sequence number that identifies the consensus round of the corresponding message. The digitally signed consensus messages can be trusted by a backup node to be secure and the sources of the messages can be verified. As such, data security and privacy of the consortium blockchain can be improved. Moreover, if a backup node is recovered from a disconnection, it can synchronize with other nodes by fetching missed messages from another random consensus node instead of broadcasting a fetch request to the entire network. Because the messages fetched from another consensus node bear the issuing node's digital signature, the sources of the messages can be trusted and the backup node may be able to fetch all missed messages from one node through one synchronization. As such, the complexity of synchronization or consensus can be reduced to $O(1)$ under ideal condition, as compared to $O(n)$ based on standard multicasting method in PBFT. Correspondingly, computational and network resources can be saved, and the efficiency of the PBFT system can be improved.

The described methodology can ensure the efficient usage of computer resources (for example, processing cycles, network bandwidth, and memory usage), through the efficient update of the blockchain. The account operations can be more quickly and securely made through simpler consensus processes.

Implementations and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for facilitating a consensus process in a blockchain network based on practical Byzantine fault tolerance (PBFT), comprising:
    setting, by a first consensus node, a first timer that initiates a view change upon expiration;
    setting, by the first consensus node, a second timer that expires before the first timer;
    in response to the second timer expiring, sending, to a second consensus node, a request for one or more missing consensus messages, wherein the one or more missing consensus messages were previously transmitted to the first consensus node, but not received by the first consensus node;
    receiving, from the second consensus node, the one or more missing consensus messages each digitally signed by a private key of a corresponding consensus node that generates the one or more missing consensus messages;
    combining the one or more missing consensus messages with one or more received consensus messages to create a set of consensus messages; and determining that a block of transactions is valid, if a quantity of commit messages included in the set of consensus messages is greater than or equal to 2f+1, where f is a maximum number of faulty nodes that is tolerable by the blockchain network based on PBFT, and wherein n is a total number of consensus nodes in the blockchain network and f is a largest integer less than or equal to (n−1)/3.

2. The computer-implemented method of claim 1, wherein the request includes a sequence number that indicates a number of a consensus round.

3. The computer-implemented method of claim 1, wherein the one or more missing consensus messages include one or more of pre-prepare messages, prepare messages, and commit messages missed by the first consensus node.

4. The computer-implemented method of claim 1, wherein the one or more missing consensus messages are stored in one or more consensus nodes in which they are generated or stored, until a stable checkpoint is reached.

5. The computer-implemented method of claim 1, further comprising receiving one or more sequence numbers corresponding to the one or more missing consensus messages, wherein each sequence number indicates a number of a consensus round associated with a corresponding consensus message.

6. The computer-implemented method of claim 1, further comprising submitting the block of transactions to a blockchain and a status database, if the block of transactions is determined valid.

7. The computer-implemented method of claim 1, further comprising:
sending, to a third consensus node, a request for a second one or more missing consensus messages by the second consensus node in response to the second timer expiring and if the block of transactions is determined invalid;
receiving, from the third consensus node, the second one or more missing consensus messages each digitally signed by a private key of a corresponding consensus node that generates the second one or more missing consensus messages;
combining the second one or more missing consensus messages with the one or more missing consensus messages and one or more received consensus messages to create a second set of consensus messages; and
determining that the block of transactions is valid, if a quantity of commit messages included in the second set of consensus messages is greater than or equal to 2f+1.

8. A non-transitory, computer-readable medium storing one or more instructions executable by a computer system to perform operations for facilitating a consensus process in a blockchain network based on practical Byzantine fault tolerance (PBFT), the operations comprising:
setting, by a first consensus node, a first timer that initiates a view change upon expiration;
setting, by the first consensus node, a second timer that expires before the first timer;
in response to the second timer expiring, sending, to a second consensus node, a request for one or more missing consensus messages, wherein the one or more missing consensus messages were previously transmitted to the first consensus node, but not received by the first consensus node;
receiving, from the second consensus node, the one or more missing consensus messages each digitally signed by a private key of a corresponding consensus node that generates the one or more missing consensus messages;
combining the one or more missing consensus messages with one or more received consensus messages to create a set of consensus messages; and
determining that a block of transactions is valid, if a quantity of commit messages included in the set of consensus messages is greater than or equal to 2f+1, where f is a maximum number of faulty nodes that is tolerable by the blockchain network based on PBFT, and wherein n is a total number of consensus nodes in the blockchain network and f is a largest integer less than or equal to (n−1)/3.

9. The non-transitory, computer-readable medium of claim 8, wherein the request includes a sequence number that indicates a number of a consensus round.

10. The non-transitory, computer-readable medium of claim 8, wherein the one or more missing consensus messages include one or more of pre-prepare messages, prepare messages, and commit messages missed by the first consensus node.

11. The non-transitory, computer-readable medium of claim 8, wherein the one or more missing consensus messages are stored in one or more consensus nodes in which they are generated or stored, until a stable checkpoint is reached.

12. The non-transitory, computer-readable medium of claim 8, the operations further comprising receiving one or more sequence numbers corresponding to the one or more missing consensus messages, wherein each sequence number indicates a number of a consensus round associated with a corresponding consensus message.

13. The non-transitory, computer-readable medium of claim 8, the operations further comprising submitting the block of transactions to a blockchain and a status database, if the block of transactions is determined valid.

14. The non-transitory, computer-readable medium of claim 8, the operations further comprising:
sending, to a third consensus node, a request for a second one or more missing consensus messages by the second consensus node in response to the second timer expiring and if the block of transactions is determined invalid;
receiving, from the third consensus node, the second one or more missing consensus messages each digitally signed by a private key of a corresponding consensus node that generates the second one or more missing consensus messages;
combining the second one or more missing consensus messages with the one or more missing consensus messages and one or more received consensus messages to create a second set of consensus messages; and
determining that the block of transactions is valid, if a quantity of commit messages included in the second set of consensus messages is greater than or equal to 2f+1.

15. A computer-implemented system for facilitating a consensus process in a blockchain network based on practical Byzantine fault tolerance (PBFT), comprising:
one or more computers; and
one or more computer-readable memories coupled to the one or more computers and having instructions stored thereon which are executable by the one or more computers to perform operations comprising:
setting, by a first consensus node, a first timer that initiates a view change upon expiration;
setting, by the first consensus node, a second timer that expires before the first timer;

in response to the second timer expiring, sending, to a second consensus node, a request for one or more missing consensus messages, wherein the one or more missing consensus messages were previously transmitted to the first consensus node, but not received by the first consensus node;

receiving, from the second consensus node, the one or more missing consensus messages each digitally signed by a private key of a corresponding consensus node that generates the one or more missing consensus messages;

combining the one or more missing consensus messages with one or more received consensus messages to create a set of consensus messages; and determining that a block of transactions is valid, if a quantity of commit messages included in the set of consensus messages is greater than or equal to 2f+1, where f is a maximum number of faulty nodes that is tolerable by the blockchain network based on PBFT, and wherein n is a total number of consensus nodes in the blockchain network and f is a largest integer less than or equal to (n−1)/3.

16. The computer-implemented system of claim 15, wherein the request includes a sequence number that indicates a number of a consensus round.

17. The computer-implemented system of claim 15, wherein the one or more missing consensus messages include one or more of pre-prepare messages, prepare messages, and commit messages missed by the first consensus node.

18. The computer-implemented system of claim 15, wherein the one or more missing consensus messages are stored in one or more consensus nodes in which they are generated or stored, until a stable checkpoint is reached.

19. The computer-implemented system of claim 15, the operations further comprising receiving one or more sequence numbers corresponding to the one or more missing consensus messages, wherein each sequence number indicates a number of a consensus round associated with a corresponding consensus message.

20. The computer-implemented system of claim 15, the operations further comprising submitting the block of transactions to a blockchain and a status database, if the block of transactions is determined valid.

* * * * *